Nov. 14, 1967  B. W. SIRYJ  3,353,036
MULTIPLE VARIABLE SWITCHER
Filed Oct. 30, 1964  7 Sheets-Sheet 1

INVENTOR
BOHDAN W. SIRYJ
BY Claude Funkhouser
ATTORNEY
R. R. Anderson
AGENT

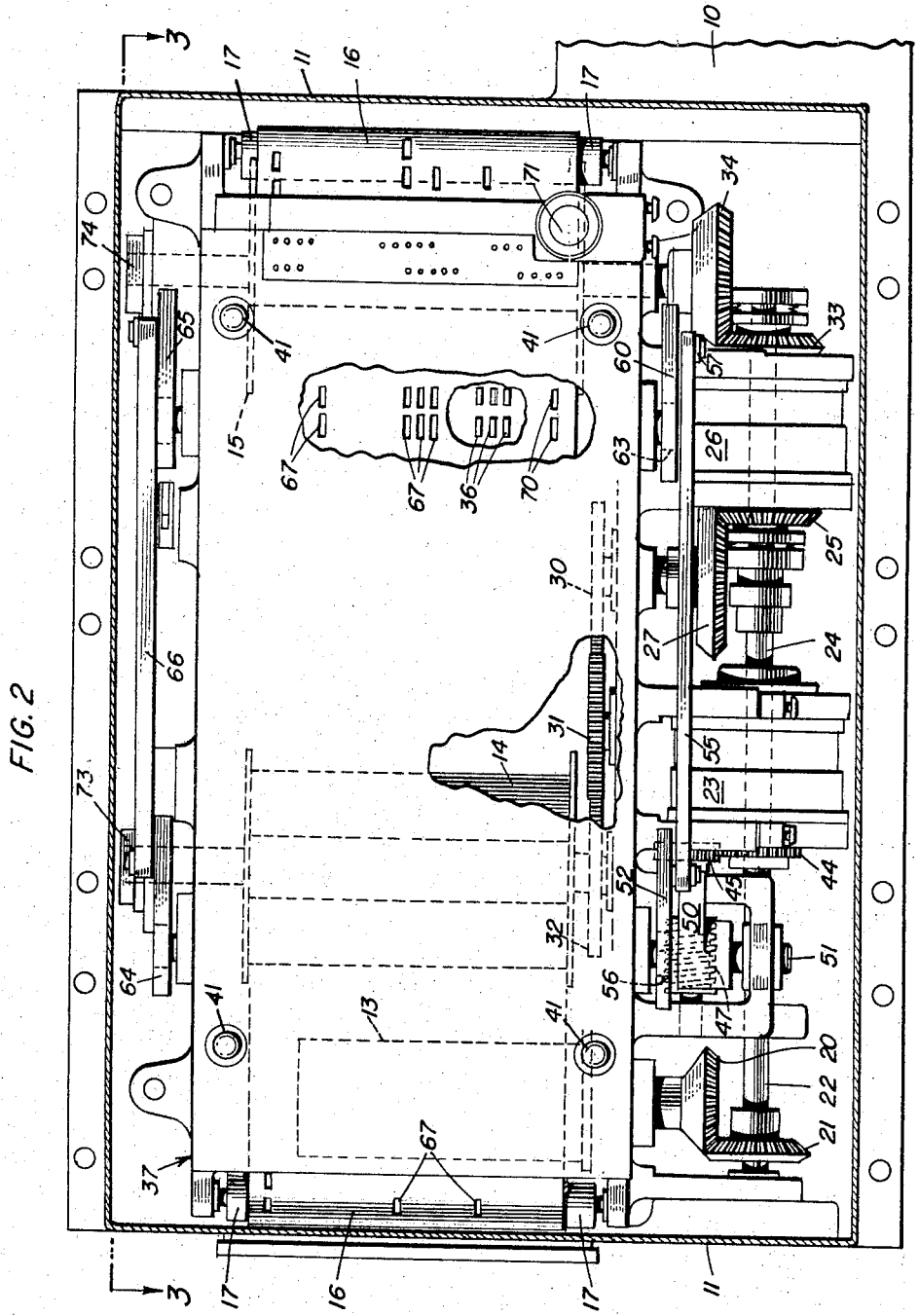

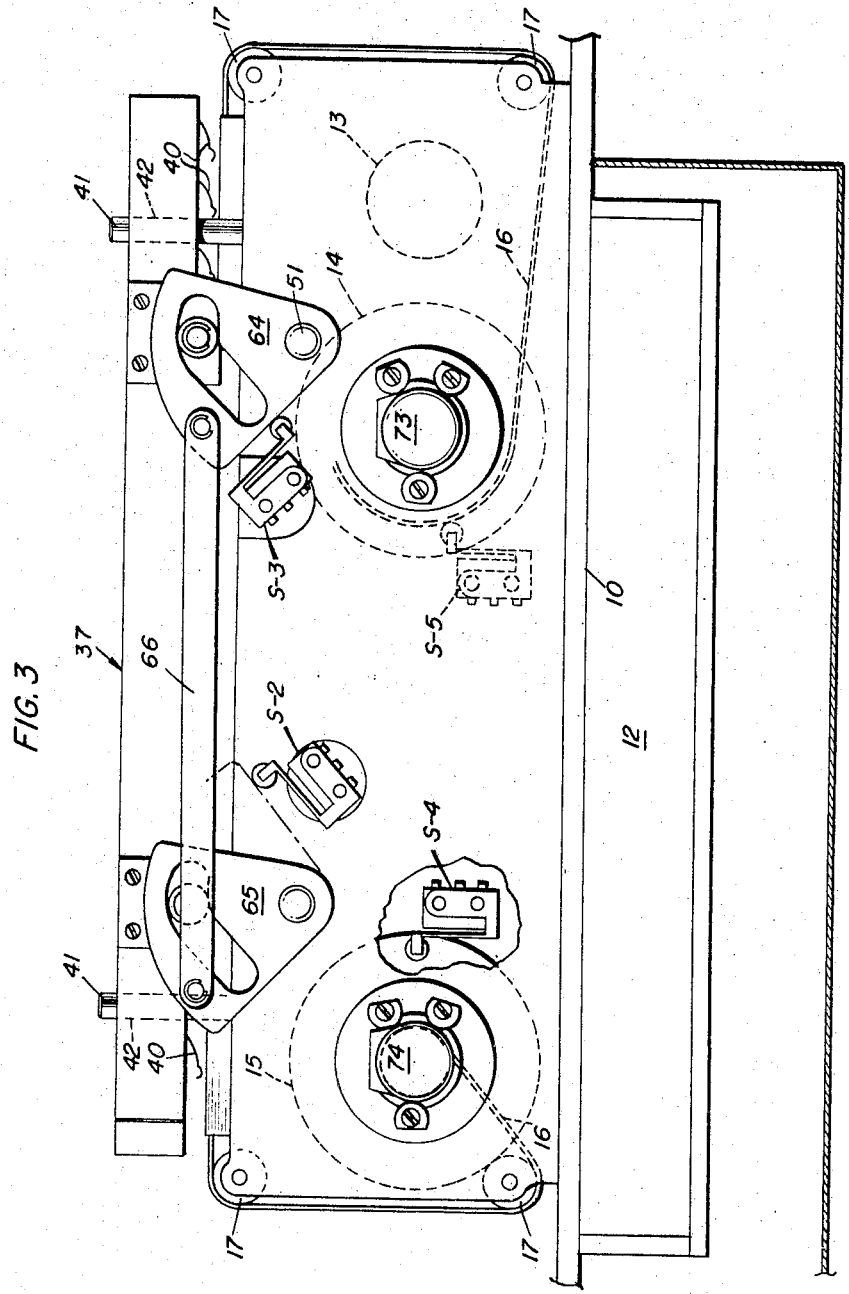

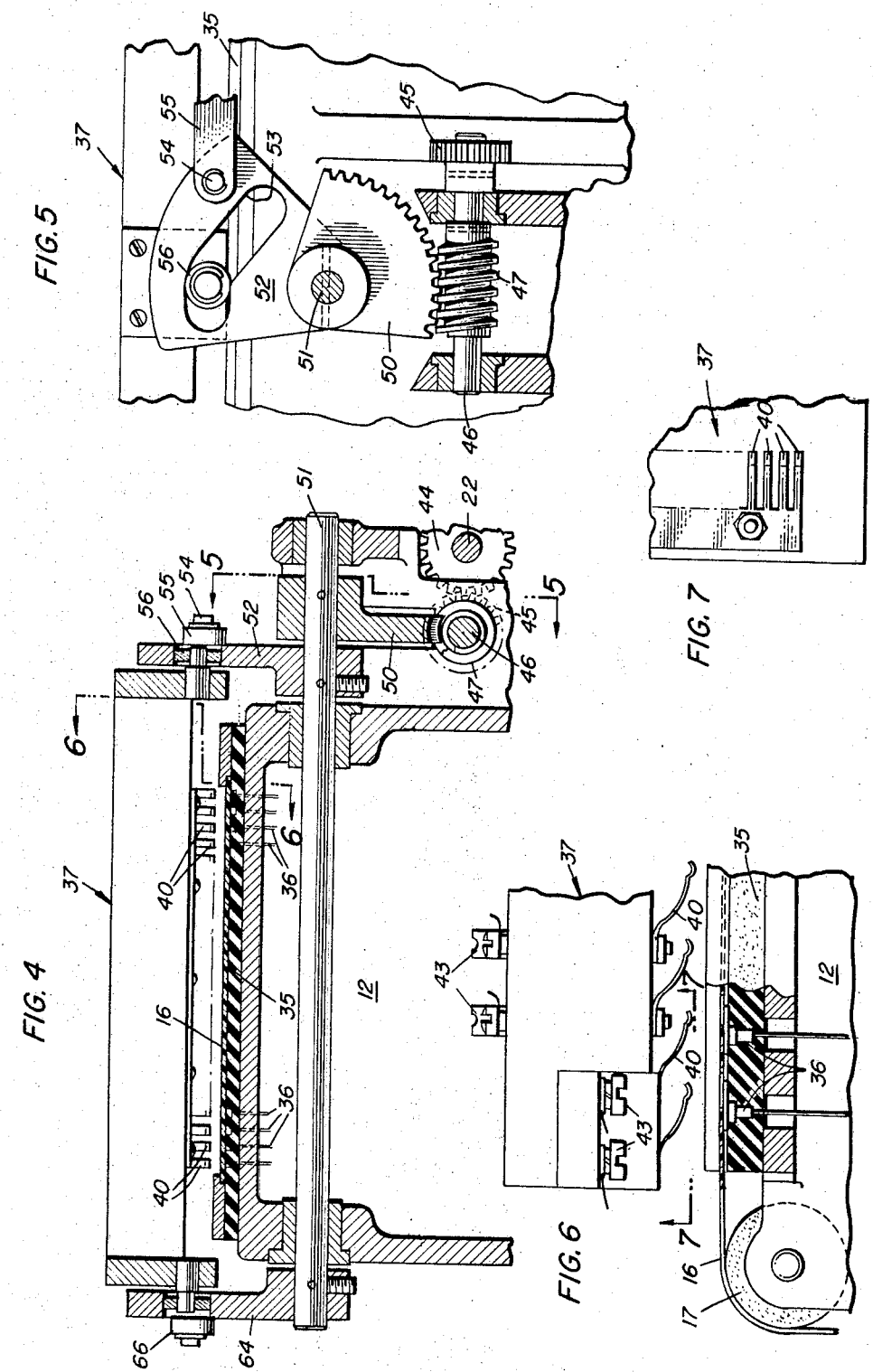

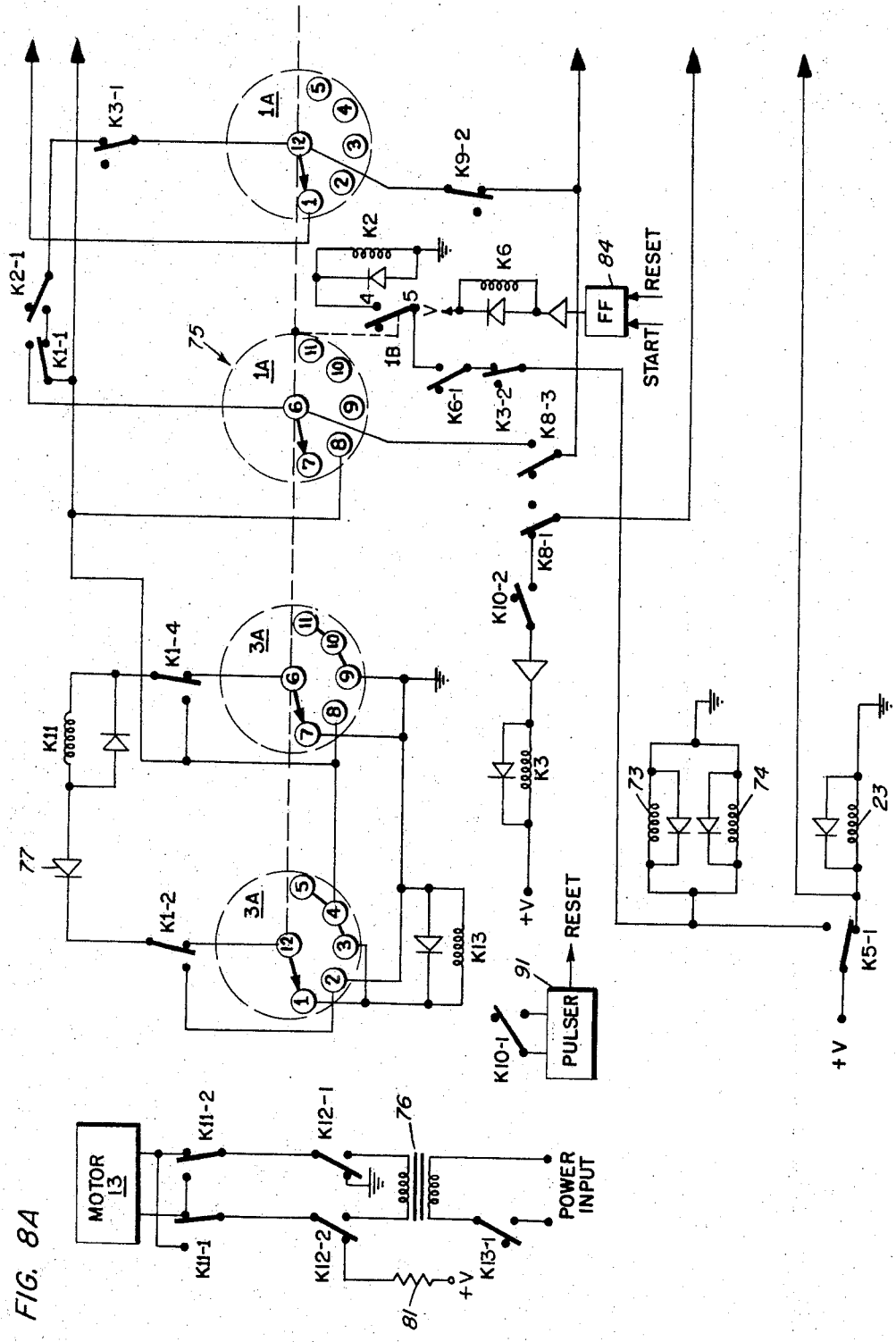

United States Patent Office 3,353,036
Patented Nov. 14, 1967

3,353,036
MULTIPLE VARIABLE SWITCHER
Bohdan W. Siryj, Philadelphia, Pa., assignor, by mesne assignments, to the United States of America as represented by the Secretary of the Navy
Filed Oct. 30, 1964, Ser. No. 407,943
5 Claims. (Cl. 307—149)

ABSTRACT OF THE DISCLOSURE

A device for automatically switching from one electrical circuit to another in order to test the continuity thereof, the testing being performed by means of a programed Mylar tape. The tape moves between two contact boards and is sensed by perforations along its edge so that at the proper time the tape stops, the two contact boards move toward each other, and metallic fingers make contact through perforations in the tape. After the continuity test is made the two contact boards move apart again and the tape moves to the next position.

---

Figure 1:
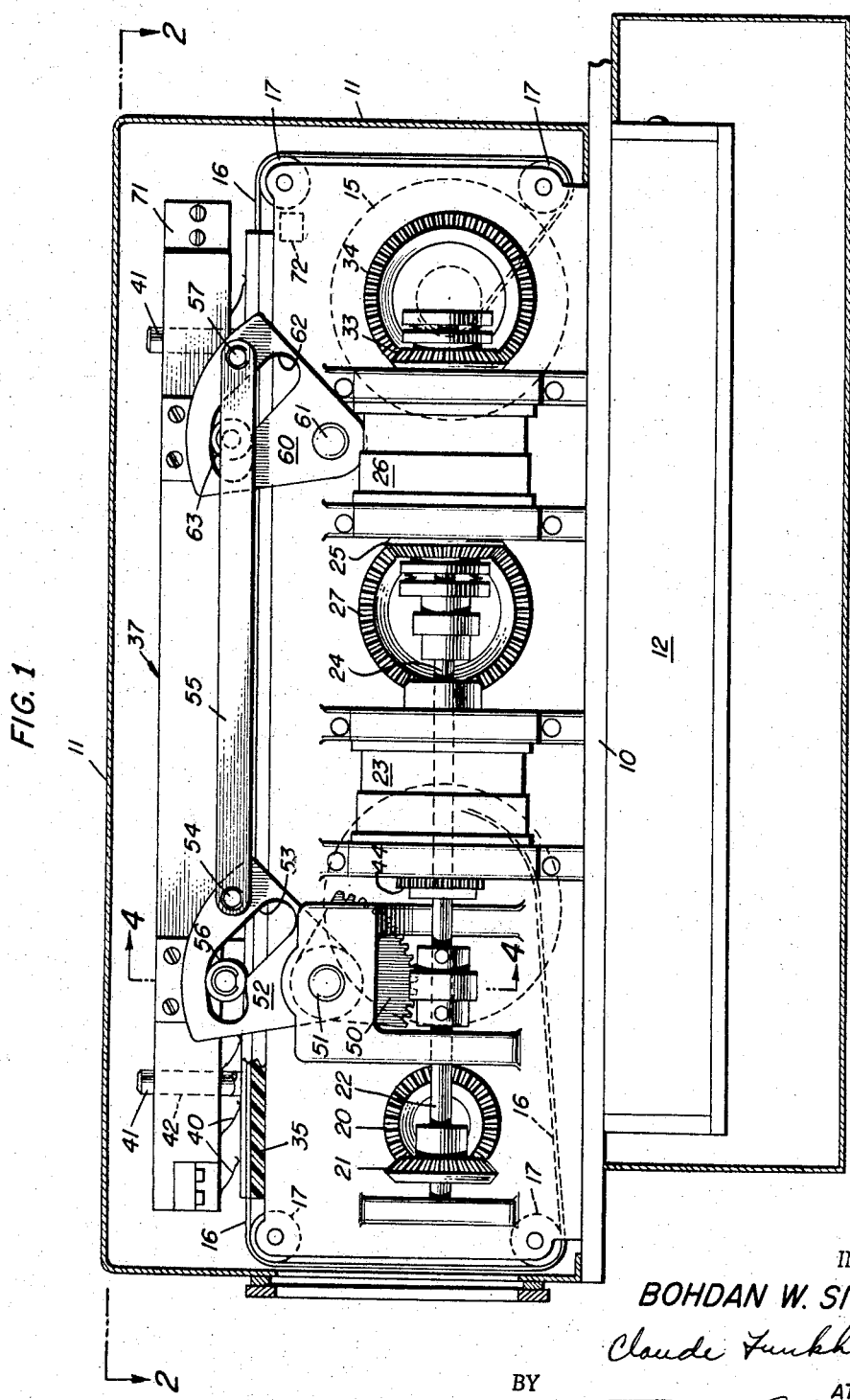

This invention relates in general to multiple variable switching apparatus and in particular to a multiple variable switcher which is programed by means of tape for testing electrical devices having a number of electric circuits.

In present day technology, employing countless, complex, interconnected electronic components it frequently becomes necessary to check the electrical continuity of a portion, or even all, of the individual units before the complete system is turned on or put into operation. This can be a complicated, time consuming procedure which can be aggravated by the time involved in disconnecting and then reconnecting the individual components.

The testing phase generally consists of selecting the desired circuit or circuits to be tested and applying to these circuits a suitable electric signal. These steps will have to be repeated with each circuit present in the interconnecting cables and/or the electrical equipment. It can readily be seen that a large amount of time can be expended merely in the selection of the various circuits for testing purposes.

Attempts to mechanize the testing of such complex electrical components have generally encountered the objections of being too complex, too expensive, or insufficiently adaptable to the rapid or automatic testing of the different circuits.

The present invention has effectively overcome the many disadvantages and undesirable features enumerated above as being inherent in prior art testing systems. In the multiple variable switcher of the instant invention testing of complex interconnected components, such as a sophisticated communication system, to cite one example, is easily, rapidly, and accurately accomplished either by manual operation or automatically by means of programed controls. These results are obtained by positioning an opaque Mylar tape between two contact boards each having a plurality of prearranged contacts. One of these boards has literally hundreds of delicate, beryllium copper, springs, or fingers which are positioned opposite a like number of metallic pads, or contacts, on the other board. The Mylar tape has a number of holes punched in it, the number and arrangement of which is determined by which test is to be made and which circuits in the system under test are being sampled. The beryllium springs reach through the holes in the Mylar tape and make contact with mating metallic pads to complete the test circuit. A motion train including a motor, clutches, brakes, and relays controls the movement of the two contact boards toward and away from the tape, as well as the lateral positioning of the tape itself with respect to the contact boards. The number and type of tests desired, will determine the length of tape required. Once a particular test has been made, electrical controls separate the two contact boards, advance the tape to a new position having a different arrangement of slots, and then recloses the boards for the next check-out.

Accordingly, an object of this invention is to provide improved apparatus for testing electric circuits.

Another object of the invention is to provide an improved multiple variable switcher for use in testing electric circuits.

Still another object of this invention is the provision of electric circuit testing apparatus capable of selecting only certain portions of the circuit for testing.

Yet another of this invention is to provide electric circuit testing apparatus capable of being easily and quickly programed to test different circuit configurations.

A further object of this invention is to provide an electric circuit testing apparatus which is capable of automatically selecting a number of different circuit portions for testing purposes.

Figure 8B:
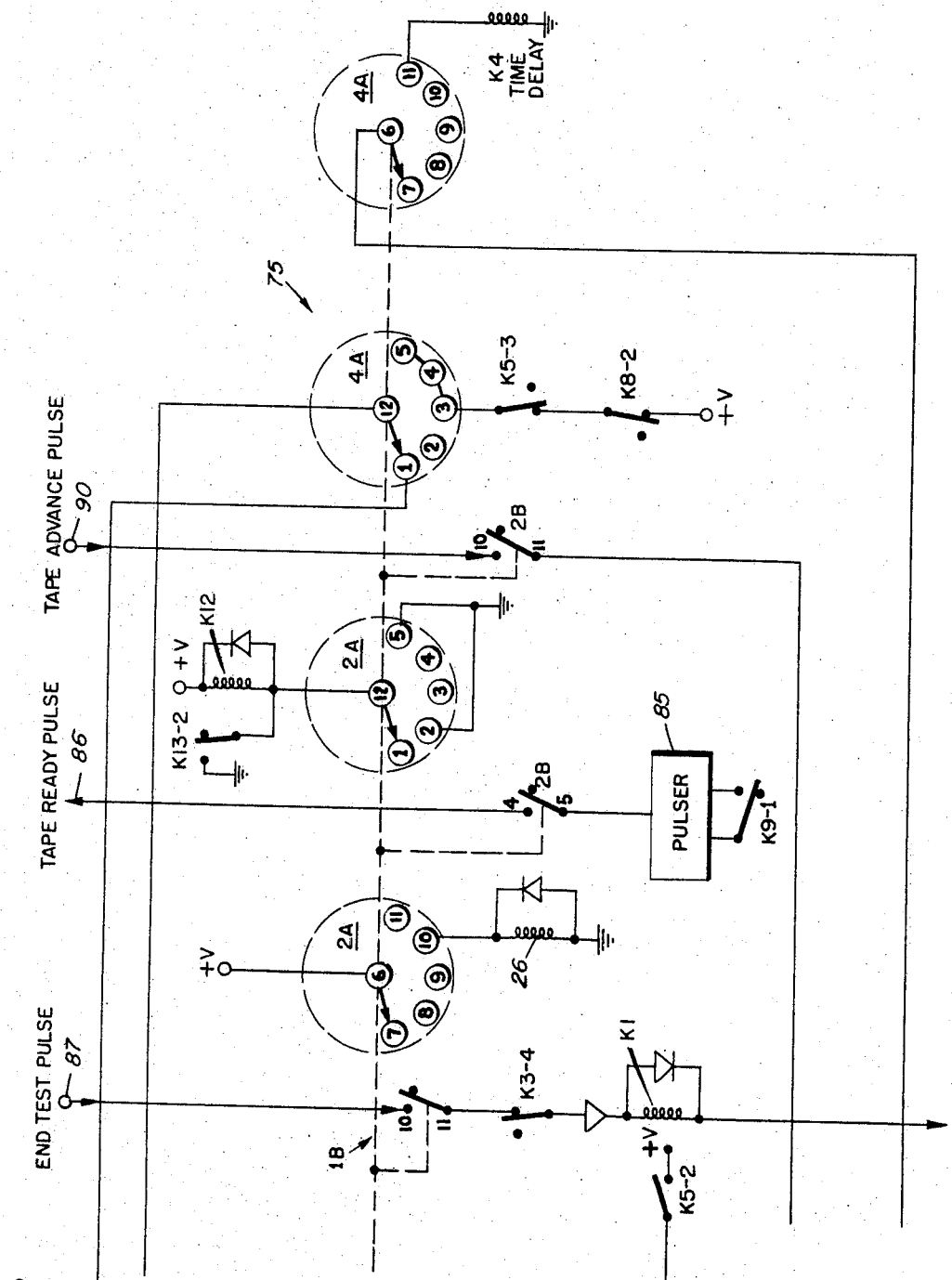
Figure 8C:
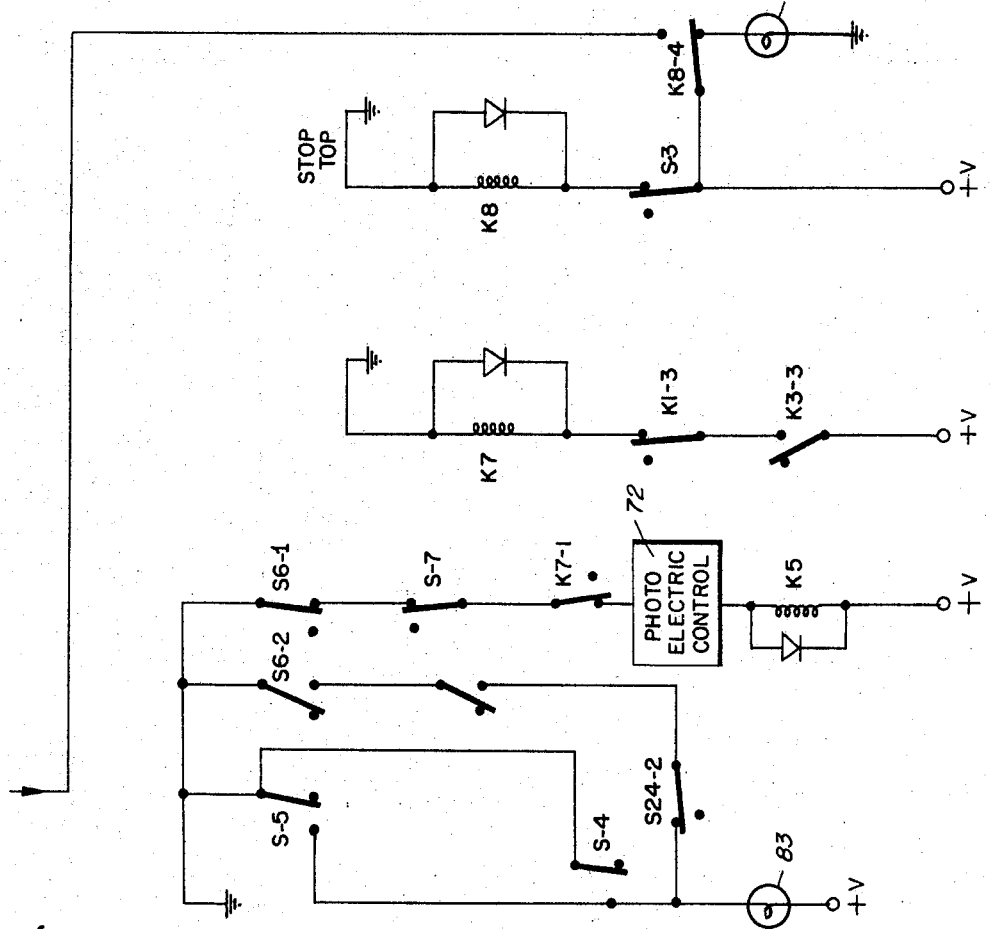

Other objects and many of the attendant advantages of this invention will be readily appreciated as the same becomes better understood by reference to the following detailed description when considered in connection with the accompanying drawings wherein:

FIG. 1 shows a side view of the invention;
FIG. 2 shows a top view of the switcher taken along the line 2—2 of FIG. 1;
FIG. 3 shows another side view of the switcher, taken along the line 3—3 of FIG. 2, and having the top cover removed;
FIG. 4 is a sectional view taken along the line 4—4 of FIG. 1;
FIG. 5 is a sectional view taken along the line 5—5 of FIG. 4;
FIG. 6 is a sectional view taken along the line 6—6 of FIG. 4;
FIG. 7 is a sectional view taken along the line 7—7 of FIG. 6; and
FIGS. 8A, 8B, and 8C show a schematic diagram of the control circuits of the invention.

Referring now to the drawings wherein like reference numerals refer to like parts throughout the several views there is shown a base or support member 10 over which is placed a cover 11 to protect the variable multiple switcher positioned on the base 10. Below the base 10 is located an area designated generally as 12 which may be used to house the various relays and other electronic components making up the electrical controls for the switcher. For the sake of clarity these components are not shown in detail in the drawings.

Looking now at the structure of the switcher itself there is shown a drive motor 13 which, through suitable gearing, is used to drive spools 14 and 15 upon which is wound a Mylar tape 16, the tape passing, for example, from spool 14 around idler pulleys 17 and onto the second spool 15. Rigidly attached to one end of the armature of drive motor 13 is a bevel gear 20 which meshes with another bevel gear 21 attached to a shaft 22, the shaft 22 in turn being attached to an element of a clutch 23. Integral with the other half of clutch 23 is a short shaft 24, having keyed thereto a bevel gear 25 before shaft 24 terminates in a second clutch 26. Bevel gear 27 meshes with gear 25 and forms part of gear train 30, 31, and 32 to apply motive power to tape spool 14, the final gear 32 being attached to the spool shaft. The back half of clutch 26 has integral therewith a bevel gear 33 which meshes with another bevel gear 34 rigidly attached to the shaft of spool 15, and it is clear from this arrangement that, depending upon the condition of clutch 26, gears 25, 27, 30, 31 and 32 will drive spool 14 to wind tape 16 in one direction, or gears 33 and 34 will drive spool 15 to wind the tape in the reverse direction.

Extending across the top of the switcher and forming one of the upper surfaces thereof is a printed circuit board 35 having a large number of contacts, or pads, 36 imbedded therein, and having pins extending through the board for electrical connections.

Directly above, and movable toward or away from, the printed circuit board 35 is a contact board 37 having a plurality of hard, gold-plated, beryllium copper springs, or fingers 40 located on the underside of the contact board. The springs 40 are alike in number and location with the contacts 36 so that when contact board 37 approaches printed circuit board 35 the springs wipe onto the contacts removing any film that may exist on the contacts and springs, thus making a firm and reliable electrical connection between the two. In order to assist in the movement of contact board 37 and to insure the accurate positioning of springs 40 relative to contacts 36, there are provided four guide posts 41 located at the corners of board 35, just beyond the boundaries of contacts 36 and tape 16. Contact board 37 has holes 42 drilled therethrough to mate with, and accommodate, guide posts 41 so that the contact board 37 freely slides along the posts. Posts 41 and holes 42 are carefully and accurately machined to provide free movement between the two components while at the same time insuring true alignment of parts 36 and 40. Due to the number of contacts on the circuit board there may be very little space between the individual contacts, and for the switcher to function properly and accurately, the springs 40 must always be opposite their corresponding contacts 36 and no others, so there must be a minimum of side play between boards 35 and 37. Electrical connection may be made to springs 40 as by screws 43, FIG. 6.

In order to provide for relative movement between printed circuit board 35 and contact board 37 there is furnished a cam and bell-crank arrangement as shown in FIGS. 1 through 5. Integral with one-half of clutch 23 is a gear 44 which may be made to rotate along with shaft 22, gear 44 meshing with and driving another gear 45 which is rigidly fastened to a short length of shaft 46. Shaft 46, in turn, has keyed to it, and extending along its longitudinal length, a worm gear 47 which rotates with shaft 46. Meshing with worm gear 47 and being turned thereby is a gear segment 50 which is pinned to a long transverse shaft 51 extending across the width of the switcher. Also pinned to shaft 51 is a pie-shaped plate 52 having an arcuate slot 53 relatively near its outer periphery, as well as one end pivot 54 of a connecting bar 55. Riding in the arcuate slot 53 so as to produce a camming action is a freely turning wheel 56 which is mounted on a short projection forming part of the outer frame of contact board 37. From this arrangement it is obvious that as the pie-shaped plate 52 is rotated about shaft 51 the wheel 56, in following the arcuate slot 53, will function to raise and lower contact board 37 depending upon the contour of the slot and the direction of rotation of plate 52.

Following along the length of connecting bar 55, from end pivot 54, there is another end pivot 57 (FIG. 1) joining a pie-shaped plate 60 pivoted at 61 and having an arcuate slot 62 with a wheel 63 rolling in the slot 62, the wheel 63 being integral with the outer frame of the contact board 37. It will be noted that plates 52 and 60 are tied together by connecting bar 55 so that they move together, plate 52 being the driving member and plate 60 the follower.

Referring now to FIGS. 2, 3 and 4 there can be seen that on the opposite side of the switcher from plates 52 and 60, there are two other plates 64 and 65 having the same shape and components as those already described, and being activated by shaft 51 since plate 64 is keyed to the shaft. A connecting bar 66 joins plates 64 and 65 so that they move in unison. From the above description of the pie-shaped plates 52, 60, 64, and 65, and their associated components, it is clear that the arrangement offers a simple and effective means for raising and lowering contact board 37, by applying a camming action to each of the corners of the board. In this way there is imparted to the board 37 a positive, fast acting motion without twisting.

Returning now to FIG. 2 there will be given briefly some additional details of the tape 16. As stated above the tape 16 unwinds from one spool (depending upon the direction of rotation), as 14 for example, follows around pulleys 17, between printed circuit board 35 and contact board 37, and is wound on spool 15. The sole purpose of the tape 16 is to program or determine which combination of springs 40 and contacts 36 shall or shall not make electrical contact. The slots 67 cut in tape 16 are clearly shown in FIG. 2, and their arrangement determines which circuits are to be tested, the springs 40 reaching through the slots 67 to make continuity with contacts 36. The tape 16 is of Mylar, or a similar material, and is opaque so that a photoelectric circuit may be employed to key the tape into proper position before a test is made. A row of special keying slots 70 is placed along one edge of the tape so that they pass between a light source 71 and a photoelectric cell 72. Microswitches S–4 and S–5 (FIG. 3) indicate the amount of tape on spools 15 and 14, respectively, and when the tape has almost run out.

In order to permit the tape 16 to move into position very rapidly, but at the same time stop quickly in proper alignment, magnetic brakes 73 and 74 (FIGS. 2, 3) are provided at one end of each spool shaft, thereby removing any momentum the spools may have.

In FIG. 3 microswitches S–2 and S–3 are used to indicate when contact board 37 is fully open and fully in proximity with circuit board 35.

For the sake of simplicity and clarity no external electrical connections are shown in the drawings, as these connections will not alter the concept or novelty of the invention.

In referring to FIGS. 8A, 8B, and 8C, conventional electrical nomenclature will be used to identify the various switches, relays, relay coils and switch relay elements. For example, the symbol K3 is used to indicate the actuating coil of a third relay; the symbol K3–4 is used to designate the fourth set of contacts that are actuated by the third relay coil; 1A is used to designate the first side of the first deck of a multiple deck rotary switch; 1B is used to designate the second side of the first deck of such a switch; and 3A7 refers to the seventh contact on the first side of the third deck of such a switch.

The circuit includes a mode selector switch generally designated as 75. This switch is of the rotary type and consists of several decks; each of these decks has an A side and a B side and each of these sides has a rotary selector member and a plurality of fixed contact points. Since some of the sides serve only to make or break one or two circuits these sides are shown for purposes of simplicity in FIG. 8 as single-pole switches although they are identified in FIGS. 8A, 8B, and 8C as being a certain side of a certain deck of switch 75. For example, see 2B10–11 and 1B10–11.

Positioning of opaque tape 16 is accomplished by means of a light source 71 and a photoelectric cell 72 positioned on opposite sides of the tape. When the tape is properly positioned for a continuity test, light passes from the light source 71 through an index perforation or keying slot 70 in the tape and is received by photoelectric cell 72. Reception of light by photoelectric control 72 will cause relay K5 to be energized and will cause motor 13 to be de-energized in a manner to be described below.

In describing the operation of this circuit it will first be assumed that switch 75 is in the first position, that tape 16 is properly positioned for a testing position, and that the contact board 37 is away from the circuit board 35. Since photoelectric control 72 is receiving light through the perforation 70 in the tape 16 relay K5 will be energized and contact K5–1 will cause clutch 23 to be de-energized. Relay K9 is kept de-energized by bottom limit switch S–2, and so continuity is established through contacts K5–2, K9–2, switch 1A12–1 and switch 4A12–1 to energize relay K13. Contact K13–1 supplies power to isolation transformer 76 and contact K13–2 enables relay K12 to be energized whereby contacts K12–1 and K12–2 connect the secondary of isolation transformer 76 to motor 13, thus causing the motor to operate to move the contact board 37 downwardly toward the circuit board 35. Diode 77 prevents relay K11 from being energized at this time.

When the contact board 37 reaches the lower end of its travel, limit switch S–2 will cause relay K9 to become energized whereby contact K9–2 will open and cause power to be removed from motor 13. Light 80 will be illuminated to indicate that the contact board 37 is in contact with the circuit board 35 and that a testing operaion may begin. The de-energization of relay K12, caused indirectly by the opening of contact K9–2, causes resistor 81 to be placed in series with the power leads of motor 13 for dynamic breaking purposes. At the beginning of the downward travel of the contact board 37 upper limit switch S–3 was closed, causing energizing of relay K8 and extinguishing of upper limit lamp 82. Opening of contact K8–2 prevents any movement of the tape while the contact board is not in the top position.

After the test has been performed, either manually by an operator or automatically by a mechanized readout apparatus, the contact board 37 must be moved up from the circuit board 35 so that the tape 16 can be advanced to the next test position. To accomplish this, mode selector switch 75 is moved to the second position (counting counter-clockwise). Since relays K5 and K8 have remained actuated, now there is continuity through contacts K5–2, K8–3, switch 1A6–8 and switch 3A6–8 to energize relays K11 and K13. Contact K11–1 and K11–2 function to reverse the polarity of power supply to motor 13 whereby the motor runs in the direction to raise the contact board 37 from the circuit board 35. The board will continue to rise until limit switch S–3 is opened and relay K8 is de-energized. Opening of contact K8–3 will cause the motor to cease operation and will cause upper limit light 82 to come on.

The apparatus is now in a position to advance tape 16 to the next test position. To accomplish this, switch 75 must first be placed in its third position. Advancement of the tape may be commenced by momentarily actuating switch S–6, which may be of the spring-return variety. This opens the circuit of relay K5 and causes that relay to become de-energized; this relay will remain de-energized although switch S–6 is returned to its normal position due to the fact that tape movement blocks the light source from photoelectric cell 72.

De-energizing of relay K5 causes clutch 23 to become energized through contact K5–1. Continuity now also exists through contacts K8–2, K5–3, and switch 4A3–12, whereby motor 13 is caused to operate as described above. Operation of motor 13 will cause rotation of takeup spool 14 through energized clutch 23 and drive train 25, 27, 30, 31, and 32 as previously described. The tape will continue to advance until an index perforation or keying slot 70 therein permits light to reach photoelectric cell 72, whereupon relay K5 will again become energized to cause deenergizing of clutch 23 and stoppage of motor 13. The tape 16 is now in a position to perform the next test operation, which may be accomplished by returning switch 75 to the first position to cause the contact board 37 to lower into contact to the circuit board 35.

If it should be desired to advance the tape more than a single test position, switch S–7 may be opened whereby the tape will continue to advance for as many positions as desired until such time as switch S–7 is again closed and photoelectric cell 72 can permit the tape to be stopped.

Switches S–4 and S–5 serve as limit switches that are actuated when tape 16 reaches the end of its travel in the forward and reverse directions, respectively. Closure of either of these switches causes warning light 83 to operate. Switch 75 must then be placed in that one of the third or fourth position which will cause the tape to retreat from its end-of-travel position through the operation of clutch 26 and gear train 33, 34 and spool 15. Following this, S–24 must be actuated so that the tape may be traversed in the selected direction.

Although the foregoing description of operation envisions the presence of an operator to control the various functions of raising and lowering the contact board 37, performing the actual test operation and of advancing and retrieving the tape, the functions of raising and lowering the contact board and of advancing and retrieving the tape may, with advantage, be performed automatically by the apparatus of this invention when used with a testing device of the programed or automatic variety. Such a programed tester, which forms no part of this invention and which may or may not be integral with the apparatus under test, will upon receiving a proper signal perform the actual phase of testing the selected portion of the circuit. The programed tester will then provide a signal to the apparatus of this invention whereby the contact board 37 will be caused to be raised, the tape advanced to the next test position, the contact board lowered and another test-start signal presented to the programed tester.

To accomplish automatic operation of the invention, switch 75 must first be placed in the fifth position. By this action, the following single-pole switch portions of switch 75 will be closed: 1B5–4, 1B10–11, 2B4–5, and 2B10–11. Assuming that the contact board 37 is in the up position and that the tape 16 is positioned for a test operation so that the photoelectric cell 72 causes relay K5 to be energized, a start pulse applied to a flip-flop 84 will cause relay K6 to be energized. Closing of contact K6–1 causes relay K2 to be energized which through the closing of contact K2–1 causes motor 13 to be energized to start lowering of the contact board. When the contact board reaches its bottommost position, relay K9 will be energized by the closing of switch S–2 and the motor 13 will be stopped by the opening of contact K9–2. Contact K9–1 causes a "tape-ready" pulse to be fed from a single pulse source 85 through output 86 to the programed testing apparatus to indicate to this apparatus that the tape is properly positioned and that the actual testing operation may begin. If the test operation produces satisfactory results, the programed tester will furnish an "end-test" pulse to input 87 to cause relay K1 to become energized. A "tape advance" pulse will also be supplied by the programed tester to input 90. Closing of contact K1–1 causes motor 13 to reverse and commence raising the contact board 37. When the board reaches the top of its travel, limit switch S–3 will cause de-energizing of relay K8 whereby motor 13 will be stopped and the "tape advance" pulse 90 will be applied through contacts K8–1 and K10–2 to actuate relay K3.

Opening of contact K3–4 causes relay K1 to become de-energized, while closing of contacts K3–3 and K1–3 causes relay K7 to become energized. The resultant opening of contact K7–1 causes relay K5 to become de-energized whereby the closing of contact K5–1 causes power to be applied to clutch 23 and, by way of switch contact 4A6–11, to time delay relay K4. Time delay relay K4 will become actuated approximately 1.8 seconds after power is applied to it, thereby de-energizing relay K10. Opening of contact K10–2 causes relay K3 to be de-energized which in turn causes relay K7 to be de-energized by the opening of contact K3–3. Closing of contact K10–1 causes single pulse source 91 to supply a reset pulse to the programed testing apparatus for removing the "end-test" and "tape advance" pulses.

At the time that relay K5 was de-energized by the opening of contact K7-1 and before the running of the 1.8 second delay of time delay relay K4, closing of contact K5-3 caused power to be supplied to motor 13 through switch contact 4A12-5. This commenced the advancing of the tape to the next test position. Although contact K7-1 will become closed again when time delay relay K4 functions, relay K5 will not at this time be energized since the beginning of advancement of the tape has caused blanking of the light 71 supplied to photoelectric cell 72. Advancement of the tape will continue until a new test position has been reached at which time light will again be supplied to photoelectric cell 72 and relay K5 will be energized to stop tape movement by opening of contact K5-1. At the same time closing of contact K5-2 supplies power to motor 13 whereby the contact board again begins to lower and another test cycle automatically begins.

The actuating coils of each of the relays and of the magnetic clutches 23 and 26, as well as brakes 73 and 74 have been bypassed by a diode for transient reduction purposes. Additional transient reduction is accomplished by the presence of isolation transformer 76 and by the particular sequence of switching afforded by the relays and switches described above. Reduction of transients in the testing apparatus becomes very important when the unit undergoing test has a high sensitivity to noise in general and to transient noise spikes in particular. Certain digital systems exhibit such sensitivity.

In the foregoing there has been described a variable switcher facilitating the testing of a complex electrical circuit. The apparatus can readily be modified to test any number of such circuits simply by changing the perforated tape. The number of individual tests to be performed on a given circuit is limited only by the length of tape supplied to the testing apparatus. Because of the interlocking nature of the circuitry, it is impossible for the tape to become damaged by an inadvertent attempt to traverse the tape while the contact board is in any position other than the uppermost. When the apparatus is used in its fully automatic mode, the "tape-ready" pulse cannot be sent until the tape is properly positioned and the contact board is fully lowered onto the circuit to be tested.

Although this invention has been described as it is used in conjunction with performance of a circuit test, the scope of its application is not to be limited thereto. The concepts of the invention could be applied, for example, whenever rapid and inexpensive selection of a number of circuits was desired.

Obviously many modifications and variations of the present invention are possible in the light of the above teachings. It is, therefore, to be understood that within the scope of the appended claims, the invention may be practiced otherwise than as specifically described.

What is claimed is:

1. A multiple variable switcher for making programed circuit tests, comprising:
    frame means having a plurality of conductive points located thereon;
    contact board mounting means positioned in spaced relationship to the frame means and being selectively movable over a specified range toward and away from the frame means;
    a contact board secured to the contact board mounting means, the contact board being a substantially planar member of insulating material containing in spaced relationship on the side having the frame means a plurality of resilient conductive contact members, the contact members being positioned to establish conductive relationship with the conductive points when the contact board is brought into close proximity thereto, contact board mounting means maintaining substantial congruity between the contact board and the conductive points in the frame means while permitting selective movement of the contact board into close proximity with the device;
    positioning means connected to the contact board mounting means for imparting thereto selective movement over the specified range;
    a thin nonconductive weblike tape disposed between and being in a plane substantially parallel with the contact board and the conductive points in the frame means, the tape having therein at least one set of perforations corresponding to the programed test to be made;
    a supply member for receiving the tape;
    a takeup member for withdrawing the tape from the supply member, the supply member and the takeup member being positioned with respect to the frame means and the contact board so as to permit successive positioning of the tape portions containing the sets of perforations between the frame means and the contact board;
    shaft means capable of receiving a source of rotary motion;
    first clutch means connected to the shaft means and being selectively capable of transferring rotary motion thereof to either of a first rotary output and a second rotary output;
    motion translation means receiving said first rotary output and converting rotary motion thereof to linear output motion, the linear output motion being operatively supplied to said positioning means whereby the contact board mounting means may be selectively moved; and
    second clutch means connected to receive the second rotary output of the first clutch means, the second clutch means being capable of transferring rotary motion to either of a third rotary output and a fourth rotary output, the third rotary output being operatively connected to said takeup member to cause operation thereof, and the fourth rotary output being operatively connected to said supply member to cause operation thereof.

2. The invention as in claim 1 wherein the tape is opaque and has for each set of perforations a corresponding index perforation, and further comprising:
    photoelectric means disposed adjacent the tape for sensing the presence of the index perforations;
    circuit means receiving the output of the photoelectric means; and
    electric motor means providing said source of rotary motion, the circuit means connected to the motor means to stop the motor means when the presence of an index perforation is sensed by the photoelectric means.

3. Apparatus as in claim 2 wherein each of said clutch means is electrically actuated, and wherein said circuit means includes:
    selector switch means having a first position causing power to be supplied to neither of the clutch means but to the motor means to cause movement of the contact board mounting means toward the frame means;
    a first limit switch actuated by the contact board mounting means at its point of closest approach to the frame means to cause power to be removed from the motor means;
    a second position of said selector switch means causing power to be supplied to neither of the clutch means but to the motor means to cause movement of the contact board mounting means away from the frame means;
    a second limit switch actuated by the contact board mounting means at its point of furthest departure from the frame means to cause power to be removed from the motor means;

a third position of said selector switch causing power to be applied to the motor means and to the first clutch means to cause the takeup member to withdraw tape from the supply member until an index perforation is sensed by the photoelectric means;

a fourth position of said selector switch causing power to be applied to the motor means and to both of the clutch means to cause the supply member to retrieve the tape withdrawn by the takeup member; and interlock means permitting movement of the tape only while the contact board mounting means is at its point of furthest departure from the frame means.

4. A multiple variable switcher for performing manual or automatic programed continuity tests comprising:

a circuit board having a plurality of contacts located thereon;

a contact board positioned in close proximity to said circuit board and movable relative thereto;

a plurality of contact springs on said contact board, said springs being on the side of the contact board nearest the circuit board and being in like number and location with the contacts on the circuit board so as to make electrical connection therewith;

a tape supply spool near the circuit and contact boards;

a take-up spool also near the circuit and contact boards;

an opaque tape wound on the supply and take-up spool and extending co-planar with and between the circuit and contact boards;

a plurality of perforations in the tape to determine the desired programed continuity tests to be made and therefore which selective springs and contacts would make electrical connection with each other;

motive power to move the contact board relative to the circuit board and to advance the tape to a new position;

a plurality of alignment perforations along one edge of the tape;

electronic circuitry responsive to said alignment perforations to stop movement of the tape when the tape is in correct position for a continuity test; and first and second clutches and gears associated with the motive power whereby said first clutch acts to move the contact board relative to the circuit board and the second clutch acts to drive the tape spools.

5. The multiple switcher of claim 4 further including: limit switches to control the extent of movement of the contact board relative to the circuit board; and additional limit switches to indicate the quantity of tape on each of the spools.

References Cited

UNITED STATES PATENTS

| | | | |
|---|---|---|---|
| 2,438,588 | 3/1948 | Tolson | 235—61.115 X |
| 2,510,559 | 6/1950 | Daly | 235—61.111 X |
| 2,803,404 | 8/1957 | Maul | 235—61.111 X |
| 3,042,299 | 7/1962 | Sherman | 235—61.111 X |
| 3,139,519 | 6/1964 | Reinschmidt | 235—61.111 X |
| 3,200,240 | 8/1965 | Hammel | 235—61.111 X |

ORIS L. RADER, *Primary Examiner.*

T. B. JOIKE, *Assistant Examiner.*